(12) United States Patent
Nelson

(10) Patent No.: US 10,557,643 B2
(45) Date of Patent: Feb. 11, 2020

(54) DEMAND VENTILATION HVAC SYSTEM COMPRISING INDEPENDENTLY VARIABLE REFRIGERANT FLOW (VRF) AND VARIABLE AIR FLOW (VAF)

(71) Applicant: Addison HVAC LLC, Orlando, FL (US)

(72) Inventor: John Nelson, Clermont, FL (US)

(73) Assignee: Addison HVAC LLC, Orlando, FL (US)

( * ) Notice: Subject to any disclaimer, the term of this patent is extended or adjusted under 35 U.S.C. 154(b) by 0 days.

(21) Appl. No.: 15/406,703

(22) Filed: Jan. 14, 2017

(65) Prior Publication Data

US 2018/0187915 A1     Jul. 5, 2018

Related U.S. Application Data

(60) Provisional application No. 62/279,193, filed on Jan. 15, 2016.

(51) Int. Cl.
| | |
|---|---|
| *F24F 11/79* | (2018.01) |
| *F24F 11/85* | (2018.01) |
| *F24F 13/10* | (2006.01) |
| *F24F 13/20* | (2006.01) |
| *F25B 13/00* | (2006.01) |
| *F25B 39/00* | (2006.01) |
| *F25B 41/04* | (2006.01) |
| *F24F 110/22* | (2018.01) |
| *F24F 110/12* | (2018.01) |
| *F25B 39/02* | (2006.01) |

(52) U.S. Cl.
CPC .............. *F24F 11/79* (2018.01); *F24F 11/85* (2018.01); *F24F 13/10* (2013.01); *F24F 13/20* (2013.01); *F25B 13/00* (2013.01); *F25B 39/00* (2013.01); *F25B 41/04* (2013.01); *F24F 2110/12* (2018.01); *F24F 2110/22* (2018.01); *F25B 39/02* (2013.01)

(58) Field of Classification Search
CPC .. F24F 11/79; F24F 11/81; F24F 11/85; F24F 13/10; F24F 13/20; F24F 2110/12; F24F 2110/22; F24F 2110/70; F25B 2313/0233; F25B 2313/02331; F25B 2700/2117
USPC .................................. 62/180, 186, 199, 200
See application file for complete search history.

(56) References Cited

U.S. PATENT DOCUMENTS

| | | | |
|---|---|---|---|
| 4,437,608 A | 3/1984 | Smith | |
| 8,261,565 B2 * | 9/2012 | Borror | F25B 23/006 62/113 |
| 8,578,726 B2 | 11/2013 | Hay | |
| 9,599,363 B1 | 3/2017 | Smith et al. | |

(Continued)

FOREIGN PATENT DOCUMENTS

EP     1855070 A2 *  11/2007  ............. F25D 16/00

OTHER PUBLICATIONS

International Search Report relating to International Application No. PCT/US2017/013605, dated May 2, 2017, 5 pages.

(Continued)

*Primary Examiner* — Marc E Norman
(74) *Attorney, Agent, or Firm* — King IP Law; Joshua King

(57) ABSTRACT

A dedicated outside air system comprising a combined variable refrigerant flow and variable air flow that provides ventilation in an energy efficient way or otherwise as desired.

21 Claims, 6 Drawing Sheets

(56) References Cited

U.S. PATENT DOCUMENTS

2003/0188543 A1* 10/2003 Trecate ................ F25B 25/005
                                                           62/96
2005/0086965 A1    4/2005  Lalumiere et al.
2011/0308265 A1   12/2011  Phannavong et al.
2013/0098077 A1    4/2013  Bonet

OTHER PUBLICATIONS

Written Opinion relating to International Application No. PCT/US2017/013605, dated May 2, 2017, 12 pages.

* cited by examiner

DEMAND VENTILATION HVAC SYSTEM COMPRISING INDEPENDENTLY VARIABLE REFRIGERANT FLOW (VRF) AND VARIABLE AIR FLOW (VAF)

CROSS-REFERENCE TO RELATED APPLICATIONS

The present application claims the benefit of U.S. Provisional Patent Application Ser. No. 62/279,193, filed Jan. 15, 2016, which application is incorporated herein by reference in its entirety.

BACKGROUND

Heating, ventilation and air conditioning (HVAC) is the technology of indoor and vehicular environmental comfort. https://en.wikipedia.org/wiki/HVAC (citation to a reference herein is not an admission that such reference constitutes prior art to the current application). Generally, HVAC systems consist of two parallel systems: a dedicated system for delivering outdoor air ventilation that handles both the latent and sensible loads of conditioning the ventilation air, and a parallel system to handle the (mostly sensible heat) loads generated by indoor/process sources and those that pass through the building enclosure. https://en.wikipedia.org/wiki/Dedicated_outdoor_air_system. A goal of an HVAC system is to provide thermal comfort and acceptable indoor air quality. HVAC is an important part of residential structures such as single family homes, apartment buildings, hotels and senior living facilities, medium to large industrial and office buildings such as skyscrapers and hospitals, onboard vessels, and in marine environments, where safe and healthy building conditions are regulated with respect to temperature and humidity, using fresh air from outdoors.

Ventilating or ventilation (the V in HVAC) is the process of exchanging or replacing air in any space to provide high indoor air quality which involves temperature control, oxygen replenishment, and removal of moisture, odors, smoke, heat, dust, airborne bacteria, carbon dioxide, and other gases. Ventilation removes unpleasant smells and excessive moisture, introduces outside air, keeps interior building air circulating, and prevents stagnation of the interior air. Ventilation includes both the exchange of air to the outside as well as circulation of air within the building. It is one of the most important factors for maintaining acceptable indoor air quality in buildings.

Despite decades of effort to increase the efficiency of, and reduce the energy demands of HVAC systems, present HVAC systems are not as efficient as possible and require unnecessary amounts of energy.

Thus, there has gone unmet a need for improved methods of increasing the efficiency and/or energy usage of HVAC systems.

The present systems and methods, etc., provide these and/or other advantages.

SUMMARY

The present systems, devices and methods, etc., provide heating, ventilation and air conditioning (HVAC) systems such as a dedicated outdoor air systems (DOAS) configured to provide carefully controlled air to at least one room, typically a building comprising a plurality of rooms each having different heating, ventilation and air conditioning settings. Such systems can provide enhanced comfort for users and improved energy usage, and/or other benefits.

The HVAC systems and methods, etc., herein comprise a plurality of independently addressable cooling heat exchangers such as evaporator coils that can be used in combination with variable refrigerant flow (VRF) and directionally variable air flow (VAF). The bulk of the discussion herein refers to evaporator coils but other suitable cooling heat exchangers can also be used. Such systems can provide ventilation in an energy efficient way based for example on accumulated $CO_2$ levels in a space, a user-input demand, or a scheduled demand.

In some embodiments, the systems and methods herein include in some embodiments variably exposable evaporator coil geometry for a 20%-100% outside air system with constant dew point leaving air control. The precise, selective control herein can be accomplished by a selected, carefully controlled variable air flow across a plurality independently addressable cooling heat exchangers and, if desired, a variable refrigerant flow, based on desired demand elements such as the heat load presented to each active evaporator coil.

Embodiments herein include a combination of a) a block-off element, i.e., directional air flow exposure valve, and b) numerous (for example, 2, 3, 5, 7 or 10 or more) independently addressable adjacent cooling heat exchangers such as evaporator coils. Typically, each heat exchanger has individual (independently addressable) refrigerant control although refrigerant control can be effected in discrete groups of 2, 3, or more, including all. The directional air flow exposure valve individually addresses air flow exposure for each of the independently addressable cooling heat exchangers. In other words, the air flow exposure valve controls the volume of air directed to the group of independently addressable cooling heat exchangers and controls which of the independently addressable cooling heat exchangers receive air flow. Thus, the amount of cooling heat exchanger surface area exposed to air flow is controllably, selectively varied based on pre-set programmed conditions such as humidity levels or gross air exchange within a room, user input, or other cooling or air conditioning demands.

In one aspect, the HVAC/DOAS systems, methods, etc., herein combine variable air and refrigerant flow to treat outside air. The unit can adjust the delivered cooling capacity and treated air flow based on a scheduled ventilation demand or the $CO_2$ levels in the space, or other factors as desired. By being able to adjust to ventilation demand the unit can deliver considerable energy savings for the end user and increased comfort to occupant users.

In one aspect, the present systems, devices and methods, etc., provide a plurality of evaporator coils each with independent refrigerant control configured to independently vary refrigerant flow for each of the evaporator coils to maintain a desired evaporator coil temperature; independent activation of evaporator coil surface for each of the plurality of evaporator coils; and, at least one block-off element disposed for independent adjustment of airflow for each of the plurality of evaporator coils, wherein the system can be configured to obtain free cooling by positioning the block-off element to direct ventilation air to bypass active evaporator coil face. The block-off element position can be controlled by a demand volume of supply air, a cooling load of the demand air volume or an outdoor humidity level for example at an about 45° F.-52° F. evaporator coil temperature.

The block-off element can be a linearly positioned sliding block-off element disposed for independent adjustment of airflow and independent activation of evaporator coil surface, and the system can comprise about 2 to 10, for example 3, 5 or 7 small stacked evaporator coils or other cooling heat exchangers. The system can be configured such that a first portion of supply air can be partly passed over an energized cold deck of an activated evaporator coil and a second portion of supply air by-passes the activated evaporator coil while maintaining a desired supply air dew point. The system can comprise at least one variable refrigerant flow compressor, can be staged with a fixed capacity vapor compression system, and can provides constant dew point leaving air.

The system can comprise a plurality of evaporators and the constant dew point leaving air can be obtained by selectively controlling variable air flow and variable refrigerant flow based on the heat load presented to each active evaporator, and can be located within a single housing and the block-off element can be a shutter or damper disposed to move up and down a front side of the housing, wherein the front side of the housing receives air flow. The shutter or damper can be a motor driven shutter or damper with a linear positioner, each evaporator coil can be disposed within an independent compartment and each independent compartment can comprise an intermediate drain pan, and heat transfer in each active evaporator coil can be maintained with an electronic expansion valve operably connected to a system controller.

In a further aspect, the present systems, devices and methods, etc., provide heating, ventilation and air conditioning (HVAC) systems that can comprise a selectively and variably exposable cooling heat exchanger surface area and a directional air flow exposure valve, wherein the directional air flow exposure valve selectively, variably exposes the cooling heat exchanger surface area depending on at least one of a pre-set programmed condition or a user input.

The selectively and variably exposable cooling heat exchanger surface area can comprise a plurality of cooling heat exchangers can comprise at least a first cooling heat exchanger and a second cooling heat exchanger to provide an incrementally exposable cooling heat exchanger surface area, and the system further can comprise a cooling heat exchanger controller. The plurality of independently addressable cooling heat exchangers can each have independently variable refrigerant flow, and the heat exchangers can be evaporator coils. The directional air flow exposure valve can be a shutter or damper, and the cooling heat exchanger surface area can be varied depending on at least one of humidity levels, gross air exchange within a room or user-input temperature level. The system can maintain an about 45° F. to 52° F. cooling heat exchanger surface temperature, and the directional air flow exposure valve can be a linearly positioned sliding block-off element disposed for independent adjustment of airflow and independent activation of cooling heat exchanger surface.

The plurality of independently addressable cooling heat exchangers can comprise 2 to 10, such as 3, 4, 5 or 7, small stacked cooling heat exchangers. The system can be configured such that a first portion of supply air can be partly passed over an energized cold deck of an activated cooling heat exchanger surface and a second portion of supply air by-passes the activated cooling heat exchanger surface while maintaining a desired supply air dew point. The system can comprise at least one variable refrigerant flow compressor, and the system can be staged with a fixed capacity vapor compression system or any other desired HVAC system, and the system can provide constant dew point leaving air.

The system can comprise a plurality of evaporators and the constant dew point leaving air can be obtained by selectively controlling variable air flow and variable refrigerant flow based on the heat load presented to each active evaporator, can be located within a single housing, and the directional air flow exposure valve can be a shutter disposed to move up and down a front side (proximal side) of the housing, wherein the front side of the housing receives air flow. The shutter can be a motor driven shutter controlled by a linear positioner, or one or more dampers configured to independently open and close as directed by the system controller. The plurality of independently addressable cooling heat exchangers can be disposed within an independent compartment and each independent compartment can comprise an intermediate drain pan.

Heat transfer in each active cooling heat exchanger surface can be maintained with an electronic expansion valve operably connected to the system controller, the directional air flow exposure valve can selectively, sequentially expose or cover the independently addressable cooling heat exchangers. The system controller can position the directional air flow exposure valve to shunt bypass air to obtain a desired mixed leaving air temperature and relative humidity, and the system can comprise compartment seal such as a track and brush system to seal each independently addressable cooling heat exchanger.

The HVAC system can be combined with a fixed capacity HVAC system or any other HVAC or DOAS system as desired. The controller can control the HVAC system to simultaneously reduce fan motor watt usage, condenser fan motor watt usage and compressor watt usage when the system is operating at outside air temperatures lower than design ambient. The controller can comprise control logic that incorporates parallel operation of multiple electronic expansion devices based on activation of individual independently addressable cooling heat exchangers based on a selected level of ventilation demand. The controller can also or instead comprise control logic configurable by a user to provide variable ventilation based on one or more input parameter selected from:

a. Zone Scheduling
  b. Zone $CO_2$ to ambient $CO_2$ Comparison
  c. Zone Occupancy
  d. Zone Schedule with $CO_2$ Override
  e. Bioeffluent Level The embodiments herein also comprise methods such as methods of manufacturing or using systems as discussed herein, and further can comprise algorithms configured to control a system as discussed herein.

In a further aspect, the present systems, devices and methods, etc., can comprise A) a plurality of independently addressable cooling heat exchangers wherein each cooling heat exchanger has independently variable air flow and independently variable refrigerant flow, and B) a system controller operably connected to independently control the independently variable air flow and independently variable refrigerant flow for each of the cooling heat exchangers. The systems further can comprise at least one directional air flow exposure valve disposed for independent adjustment of airflow for each of the plurality of independently addressable cooling heat exchangers, and can comprise a plurality of evaporator coils comprising a first cooling heat exchanger and a second cooling heat exchanger and a cooling heat exchanger controller, wherein the incrementally exposable evaporator coil surface area can be selectively more exposed or less exposed depending on increasing or decreasing air flow demand.

The HVAC system can be a dedicated outdoor air system (DOAS). The DOAS can comprise a minimum outside air component of about 20%, about 50% or about 100%. The cooling heat exchangers can be evaporator coils, which can be a unit providing selectively and incrementally exposable cooling heat exchanger surface area. The incrementally exposable cooling heat exchanger surface area can be turned down as desired, for example to 80%, 60%, 40%, or 20% of full cooling heat exchanger surface area capacity.

In a further aspect, the present systems, devices and methods, etc., can comprise dedicated outside air system (DOAS) that receives outside air, recycled air, or combinations thereof and directs the air through air control components to provide ventilation at least one room, the air control components can comprise:

a supply air system having a fan that pushes or pulls the air through dedicated outside air system, a refrigeration system having an evaporator coil unit with a first evaporator coil unit and a second evaporator coil unit, the first evaporator coil unit having a first evaporator coil and a first drain pan, the second evaporator coil unit having a second evaporator coil and a second drain pan, a compressor system having a compressor, a compressor controller, a coolant, and a manifold system having a first valve and a second valve, wherein the compressor directs a variable amount of coolant toward the evaporator coil unit, the manifold receives and distributes (a) a first desired amount of coolant toward the first valve and when the first valve can be open the coolant enters the first evaporator coil and (b) a second desired amount, as determined by the compressor controller, of coolant toward the second valve and when the second valve can be open the coolant enters the second evaporator coil such the first evaporator coil selectively operates at a same temperature, higher temperature or lower temperature than the second evaporator coil;

a refrigeration block-off system having a block-off controller, a first block-off element positioned upstream from the first evaporator coil unit and a second block-off element positioned upstream from the second evaporator coil unit, the block-off controller receiving sensor signals can comprise (a) an evaporation temperature of the air, (b) a temperature of air entering the evaporator coil unit to provide an entering evaporator coil air temperature, (c) a humidity of air entering the evaporator coil unit to provide an entering evaporator coil air relative humidity, (d) a supply air temperature and (e) a supply air relative humidity, and based on those signals the shutter controller selectively increases or decreases air transmitted through the block-off system to (C) to control a first volume of air passing by the first evaporator coil unit, and (B) control a first volume of air passing by the second evaporator coil unit.

The system can comprise an outdoor air block-off system controlled by an outdoor air block-off system actuator positioned between the shutter system and an outdoor air opening, and at least one outdoor air sensor configured to indicate carbon dioxide content in the outdoor air, temperature of the outdoor air and relative humidity of the outside air. The outdoor air sensor can be positioned between the outdoor air opening and the outdoor air block-off member. The outdoor air block-off system can comprise a first block-off element positioned upstream from the first evaporator coil unit and a second block-off element positioned upstream from the second evaporator coil unit. The system can comprise a variable refrigerant flow and a variable air flow, wherein the variable refrigerant flow and the variable air flow can be selectively controlled to increase energy efficiency when providing the ventilation to the room.

These and other aspects, features and embodiments are set forth within this application, including the following Detailed Description and attached drawings. Unless expressly stated otherwise, all embodiments, aspects, features, etc., can be mixed and matched, combined and permuted in any desired manner. In addition, various references are set forth herein, including in the Cross-Reference To Related Applications, that discuss certain systems, apparatus, methods and other information; all such references are incorporated herein by reference in their entirety and for all their teachings and disclosures, regardless of where the references may appear in this application.

DETAILED DESCRIPTION

Figure 1:
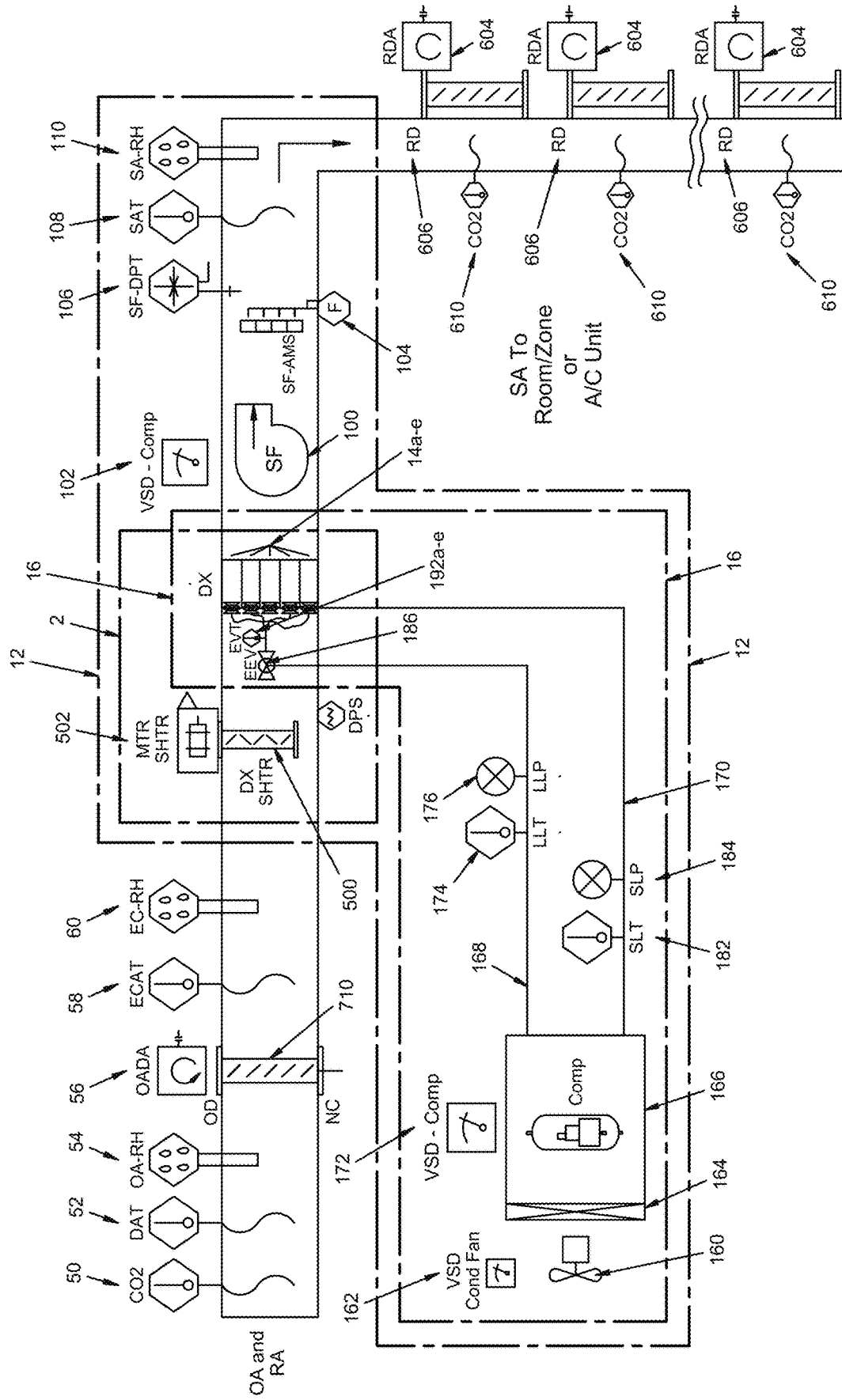
FIG. 1 illustrates an HVAC system as discussed herein comprising variable refrigerant flow (VRF) and variable air flow (VAF).

The present systems, devices, methods, etc., provide HVAC systems configured to provide controlled and conditioned air to at least one room, and typically a building comprising a plurality of rooms each having different heating, ventilation and air conditioning environments and/or situations. The systems herein can provide enhanced comfort for users and improved energy usage, and/or other benefits.

The HVAC systems and methods, etc., herein comprise a plurality of independently addressable cooling heat exchangers such as evaporator coils that are used in combination with variable refrigerant flow (VRF) and variable air flow (VAF). The bulk of the discussion herein refers to evaporator coils but other suitable cooling heat exchangers can also be used, such as desiccant wheels or wetted surfaces. Such systems can provide ventilation in an energy efficient way based for example on accumulated $CO_2$ levels differentials in a space, a user-input demand, or a scheduled demand or otherwise as desired.

In some embodiments, the HVAC systems, including DOAS systems, and methods, etc., herein effectively and efficiently treat outside air under variable demand ventilation rate demands, and can if desired maintain a desired evaporator coil temperature, such as about 45° F. to 52° F. The systems and methods herein include in some embodiments variably exposable evaporator coil geometry for a 10%-100% outside air system with constant dew point leaving air control. The precise, selective control herein can be accomplished by a selected, carefully controlled variable air flow across a plurality independently addressable cooling heat exchangers and, if desired, a variable refrigerant flow, based on desired demand elements such as the heat load presented to each active evaporator coil.

Embodiments herein include a combination of a) a block-off element, i.e., directional air flow exposure valve, and b) numerous (for example, 2, 3, 5, 7 or 10 or more) independently addressable adjacent cooling heat exchangers such as evaporator coils. Typically, each heat exchanger has individual (independently addressable) refrigerant control although refrigerant control can be effected in discrete groups of 2, 3, or more, including all. The directional air flow exposure valve can be a one or more linearly positioned sliding block-off elements/shutters and/or one or more dampers and can comprise direct path laser shutter positioning and confirmation.

The directional air flow exposure valve individually addresses air flow exposure for each of the independently addressable cooling heat exchangers. In other words, the air flow exposure valve controls the volume of air directed to the group of independently addressable cooling heat exchangers and controls which of the independently addressable cooling heat exchangers receive air flow. Thus, the amount of cooling heat exchanger surface area exposed to air flow is controllably, selectively varied based on pre-set programmed conditions such as humidity levels or gross air exchange within a room, user input, or other cooling or air conditioning demands. Because of the combination of the independently addressable cooling heat exchangers and the directional air-flow exposure valve, the air conditioning demands on a system can be met without varying the total volume of air flow, without altering fan speed, and if desired without varying compressor or coolant flow within the overall cooling element of the HVAC or DOAS.

"Independently addressable evaporator coils" includes both single physical evaporator coils or discrete groups of physical evaporator coils (for example, 5 independently addressable evaporator coil units wherein each of the evaporator coils comprises two physical evaporator coils grouped together for a total of 5 evaporator coils; other groupings less than all are also possible). The cooling heat exchangers can be immediately adjacent to each other, e.g., linearly arranged and vertically stacked or horizontally side-by-side, or can be physically separated, provided that exposure of the evaporator coils/evaporator coil units to air flow and to refrigerant flow is independently addressed by one or more coordinated master controllers such that the exposure of the evaporator coils/evaporator coil units to air flow and to refrigerant flow is coordinated within the parameters discussed herein.

The exposure of the independently addressable evaporator coils/evaporator coil units to air flow and to refrigerant flow is controlled by one or more air flow exposure valves controlling the amount and location of incoming air flow and by one or more valves controlling the amount and location of incoming refrigerant flow. Such valves can be, for example, "on/off", incremental or continuously variable. Where such valves are variable, they can be turned down as desired to any desired amount. For example, in one embodiment where the system comprises 5 cooling heat exchangers that are incrementally activated, the system can be turned down to 80%, 60%, 40%, or 20% of full cooling heat exchanger surface area capacity.

Suitable directional air flow exposure valves (block-off elements) independently address exposure of each of the evaporator coils. Such block-off elements are typically disposed air-flow-upstream (i.e., proximal to the incoming air flow relative to the heat exchangers) and include for example a linearly positioned sliding block-off element, such as a rolling shutter having a leading edge that moves up and down (or side-to-side for horizontally disposed evaporator coils) inside a plastic lined track. Such a shutter can be configured to sequentially expose the evaporator coils in a same order each use. Other suitable block-off elements include independently addressable dampers that can independently open/close proximal to the evaporator coils; such embodiments may or may not sequentially expose the evaporator coils in the same order every time. The block-off element individually addresses each of the evaporator coils and thus independently adjusts airflow and activation of evaporator coil surface.

In some embodiments, the systems, methods, etc., herein use a minimum amount of variable refrigerant flow yet still maintain a desired apparatus evaporator coil temperature and desired air conditioning levels within the target area (i.e., the room(s) being serviced by the HVAC unit). The block-off element position can be controlled for example by the demand volume of supply air, the cooling load of the demand air volume or outdoor humidity level. The systems herein can obtain benefit of free cooling whenever possible, by positioning the sliding block-off or other air-flow valves to direct ventilation air to bypass active evaporator coil face area such as through inactive heat exchanger(s). For example, during free cooling the supply air can be partly passed over the cold deck of the evaporator coil, which is the energized part of the evaporator coil, while the remaining air by-passes the evaporator coils, all while maintaining, e.g., the supply air dew point at the desired level.

In some embodiments, the systems, methods, etc., herein are scalable as desired, for example with currently available variable refrigerant flow compressors, and can if desired be staged with other systems such as fixed-capacity vapor compression systems for extended capacity ranges or otherwise as desired. Examples of such uses include combining the systems, etc., herein with a second (or more) air path or with HVAC systems for situations other than DOAS. Exemplary applications include focused cooling for a process, a recirculating air system for comfort cooling, and secondary applications such as moisture removal in target area such as a supermarket or food processing facility.

Heat transfer in each active evaporator coil can be maintained by an electronic expansion valve driven by one or more master system controllers. If desired, the independently addressable evaporator coils can have evaporator coil-to-evaporator coil symmetry and similarity. Each evaporator coil circuit in each evaporator coil compartment can maintain independence from the other evaporator coil circuits by using isolation solenoids. The systems herein provide stable operation and can provide leaving air having desired and constant dew point.

Methods herein include methods of making the devices and systems, etc., herein, as well as methods of using such devices and systems.

Turning to the Figures, all embodiments in the Figures are exemplary only and do not limit the scope of the systems, methods, etc., discussed herein. For example, the Figures are directed to embodiments having evaporator coils as the cooling heat exchangers and to refrigerants other than water; such does not limit the systems herein solely to evaporator coils or to solely non-water refrigerants but instead include water and water-based coolants, regulated by a water regulating valve if desired.

Figure 2:
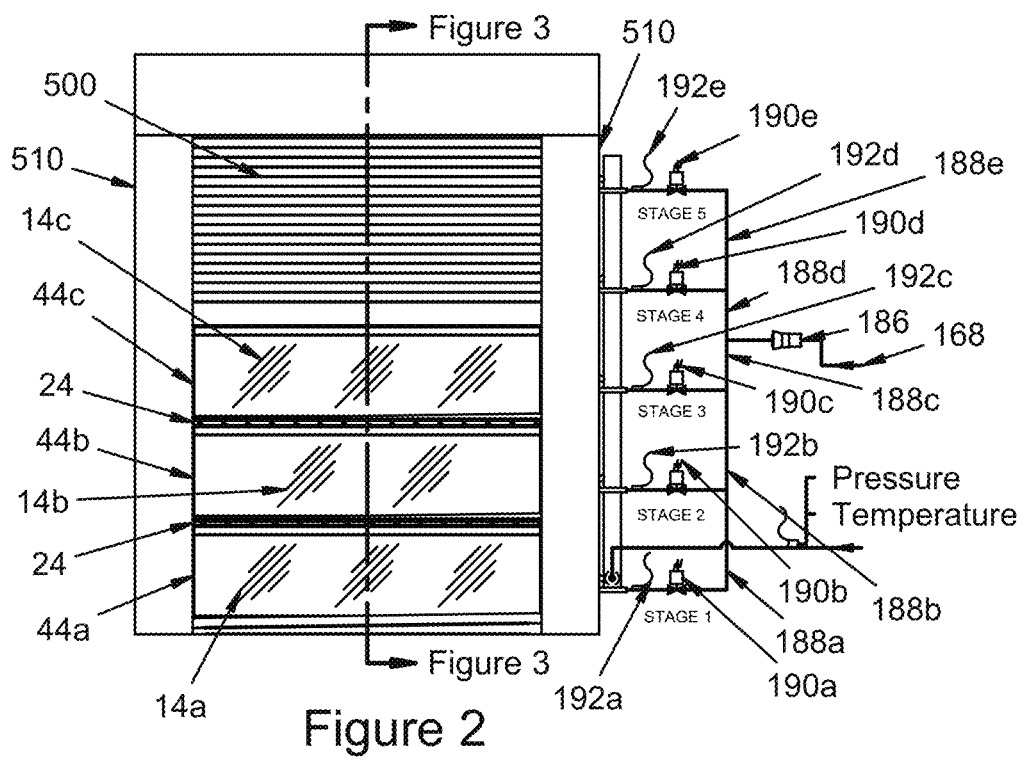
FIG. 2 is a front view of box 2 of FIG. 1.
Figure 3:
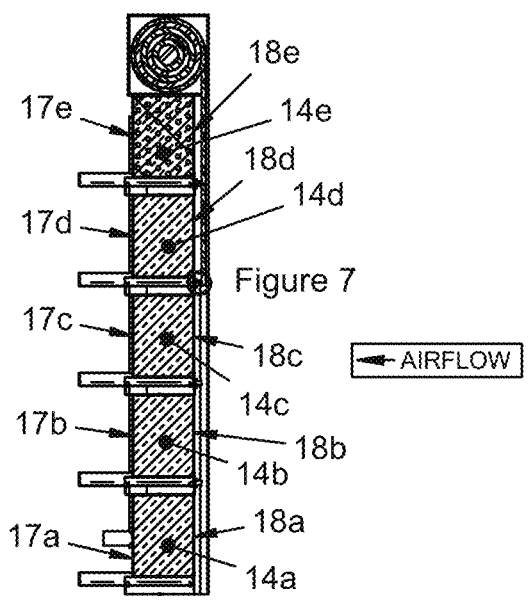
FIG. 3 is a cross-sectional view of FIG. 2 taken along the lines 3-3.

FIG. 1 depicts an HVAC system such as a dedicated outside air system (DOAS) 10, which provides a linear capacity (LC) system 12, comprising a plurality of independently addressable evaporator coils. The systems provide a combination of coordinated, precise variable refrigerant flow (VRF) and variable air flow (VAF) coupled with coordinated, precise exposure of the air flow to the evaporator coils. Exemplary components for the linear capacity system 12 to control air flow to the evaporator coils include multiple independent evaporator coils 14a to 14e (as identified in FIGS. 1, 2 and 3). Typically there are five (5) evaporator coils but two (2), three (3), four (4), six (6), ten (10) or more can be used. The evaporator coils 14a to 14e are part of a refrigeration system 16, which can be a single refrigeration system, as illustrated at FIG. 1. Even where each independent evaporator coil 14a to 14e is part of the single refrigeration system 16 having a master on/off switch, each evaporator coil 14a to 14e has an individual on/off switch or rheostat, is isolatable and has a method of refrigerant metering to generate cooling capacity when and as desired for each evaporator coil 14a to 14e. When air passes by one of the evaporator coils 14a to 14e, the air passes through an air aperture 144a to 144e (see FIGS. 2 and 8) positioned at a proximal end 18a to 18e of each evaporator coil 14a to 14e to a distal end 17a to 17e of each evaporator coil 14a to 14e as illustrated at FIG. 3 (with regard to the evaporator coils, the "proximal" end or side is the upstream side accepting incoming air flow and the "distal" end or side is the downstream side emitting outgoing air flow). There is a space between each respective proximal end and distal end.

In FIG. 1, in the embodiment depicted refrigeration system 16 has a condenser fan 160 with head pressure control. The condenser fan 160 is electrically connected to a condenser-variable speed drive controller 162. The refrigeration system 16 also has a condenser evaporator coil 164, the condenser evaporator coil 164 interconnects to a variable speed compressor 166, a liquid line 168, and a return line or suction line 170. The variable speed compressor 166 is also electrically interconnected to a compressor variable speed controller 172. The variable speed compressor 166 directs refrigerant (a.k.a., coolant) at variable mass flow rates toward the condenser where the gas is converted to liquid refrigerant and then pushed to the independent evaporator coils 14a to 14e. By directing variable flow rates of coolant toward the evaporator coils, the evaporator coils' surface temperatures are controlled to obtain desired leaving air temperature and accomplish the desired dehumidification. The condensing temperature can if desired be permitted to float to take advantage of lower energy consumption at reduced ambient temperatures, while maintaining at least adequate system refrigerant pressure to allow for proper refrigerant distribution.

Figure 4:
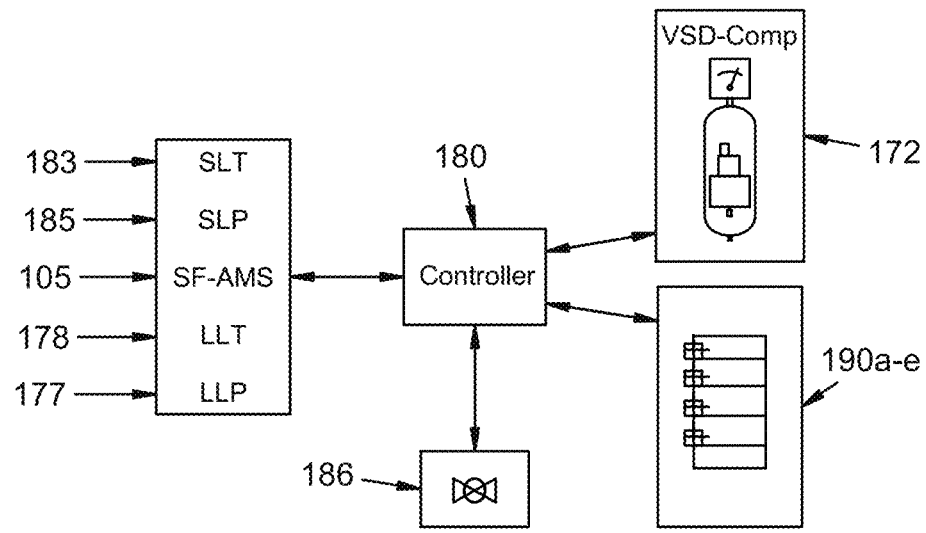
FIG. 4 is a schematic view of a compressor controller system of FIG. 1.

The liquid line 168 transmits, as illustrated at FIG. 1, coolant from the condenser evaporator coil 164 toward the appropriate evaporator coils 14a to 14e. A liquid line temperature sensor 174 and a liquid line pressure sensor 176 measure, respectively, the coolant's temperature and pressure in the liquid line 168. The liquid line temperature measurement 175 and the liquid line pressure measurement 176 are transmitted, as illustrated at FIG. 4, to a compressor controller 180. The liquid line 168 also has an electronic expansion valve/distributor (e.g., manifold) 186 positioned at or near the liquid line's 168 distal end, relative to the condenser evaporator coil 164. As illustrated at FIG. 2, the coolant passes from the liquid line 168 through the distributor 186, which can be a conventional manifold, into evaporator coil distribution lines 188a to 188e. The distributor 186 is operably connected, e.g., electrically connected, to the compressor controller 180 as illustrated at FIG. 4 to control the amount of coolant that is directed toward each evaporator coil. Positioned on each evaporator coil distribution line 188a to 188e between the distributor 186 and the respective evaporator coils 14a to 14e is a solenoid valve or a second electronic expansion valve/distributor 190a to 190e. Each valve 190a to 190e is electromechanically operated, for example, each valve can be controlled by an electric current through a solenoid that controls the coolant flow to be switched on (100% coolant flow) or off (0% coolant flow), or in some instances varies the coolant flow as desired between 0.0% and 100%. Each valve 190a to 190e is electrically interconnected, as illustrated at FIG. 4, to the compressor controller 180.

Figure 5:
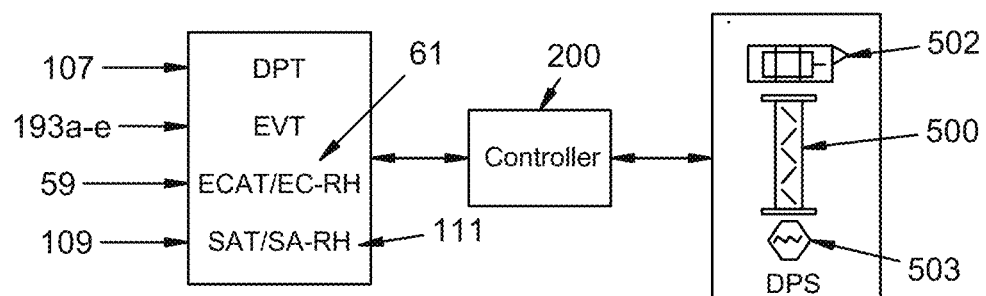
FIG. 5 is a schematic view of a shutter/damper controller system of FIG. 1.

If any coolant flows through the valve 190a to 190e, the coolant passes by a respective evaporation temperature/dew point sensor 192a to 192e, as illustrated at FIG. 2, and proceeds toward the respective evaporator coils 14a to 14e. The measurements 193a to 193e from each evaporation temperature/dew point sensor 192a to 192e are transmitted, as illustrated at FIG. 5, to a block-off controller (i.e., a device such as a shutter or damper that variably blocks-off the air flow and thus variably controls the volume and/or direction of such air flow), controlling a block-off element such as shutter/damper controller 200. The coolant then circulates through the respective evaporator coils 14a to 14e into the return line or suction line 170.

The suction line 170 transmits, as illustrated at FIG. 1, coolant from the appropriate evaporator coils 14a to 14e to the compressor 164. A suction line temperature sensor 172 and a suction line pressure sensor 184 measure, respectively, the coolant's temperature and pressure in the suction line 170. The suction line temperature measurement 183 and the suction line pressure measurement 185 are transmitted, as illustrated at FIG. 4, to the compressor controller 180.

Figure 6:
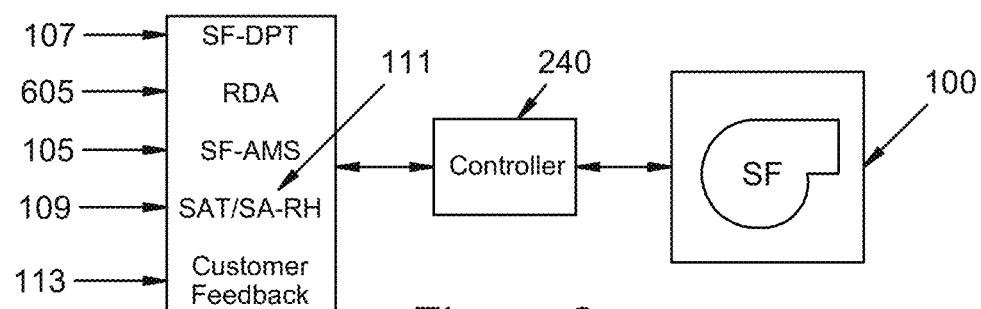
FIG. 6 is a schematic view of a fan controller system of FIG. 1.

The linear capacity system 12 also includes a supply fan 100 electrically interconnected with a variable speed drive supply fan controller 102. The variable speed drive supply fan controller 102 pushes or pulls air (recirculated air, outside air, or combinations thereof) through the DOAS 10. The pushed or pulled air passes a supply fan air-flow monitoring station/piezo ring sensor 104, a supply air differential pressure transducer 106, a supply air temperature sensor 108, and a supply air relative humidity sensor 110. The measurement 107 of the supply air differential pressure transducer 106, the measurement 109 of the supply air temperature sensor 108, and the measurement 111 of the supply air relative humidity sensor 110 are transmitted to the fan controller 240, as illustrated at FIG. 6. The measurement 105 from the supply fan air flow monitoring station/piezo ring sensor 104 is transmitted to the fan controller 240, as illustrated at FIG. 6, and the compressor controller 180, as illustrated at FIG. 4.

A liquid sub cooling evaporator coil can be used if desired to increase the available enthalpy available for each independent evaporator coil to remove additional moisture from the air stream.

Prior to the air entering the independent evaporator coils 14a to 14e, the air passes a first $CO_2$ sensor 50, an outdoor air temperature sensor 52, an outdoor air relative humidity sensor 54, an outdoor air damper actuator 56, an entering evaporator coil temperature sensor 58, and an entering evaporator coil relative humidity sensor 60. The measurement 59 from the entering evaporator coil temperature sensor 58 and the measurement 61 from the entering evaporator coil relative humidity sensor 60 are transmitted, as illustrated at FIG. 5, to the shutter/damper controller 200.

In one example of a control protocol, the compressor controller 180, as illustrated at FIG. 4, receives the air flow measurement 105, the liquid line temperature and pressure measurements 177, 178 and the suction line temperature and pressure measurements 183, 185. The compressor controller 180 analyzes those measurements 105, 177, 178, 183 and 185. After analyzing those measurements 105, 177, 178, 183 and 185, the compressor controller 180 alters (a) the speed on the variable speed compressor 172 that transmits coolant through the liquid line 168; (b) the electronic expansion valve/distributor 186 in order to control whether the coolant proceeds into all, selected or none of the evaporator coil distribution lines 188a to 188e; and (c) the solenoid valve or second electronic expansion valve/distributor 190a to 190e in order to control whether the coolant proceeds into all, selected or none of the evaporator coils 14a to 14e. The above-identified refrigerant metering system is designed to proportionally distribute liquid refrigerant (a.k.a., coolant) through appropriate manifolding to individual electronic thermostatic expansion device(s) so as to allow proper and controlled treatment of the air that has been allowed to pass across the above-identified independent evaporator coils 14a to 14e.

The shutter/damper controller 200, as illustrated at FIG. 5, receives the differential pressure transducer measurement 107, the evaporation temperature/dew point measurements 193a to 193e, the entering evaporator coil air temperature measurement 59, the entering evaporator coil relative humidity measurement 61, the supply air temperature measurement 109 and the supply air relative humidity measurement 111. The shutter/damper controller 200 divides (a) the entering evaporator coil air temperature measurement 59 by the entering evaporator coil relative humidity measurement 61 to obtain a calculated entering air condition value; and (b) the supply air temperature measurement 109 by the supply air relative humidity measurement 111 to obtain a calculated supply air condition value. From the differential pressure transducer measurement 107, the evaporation temperature/dew point measurements 193a to 193e, the calculated entering air condition value, and the calculated supply air condition value, the shutter/damper controller 200 controls the position of a mechanical shutter or damper 500.

Figure 7:
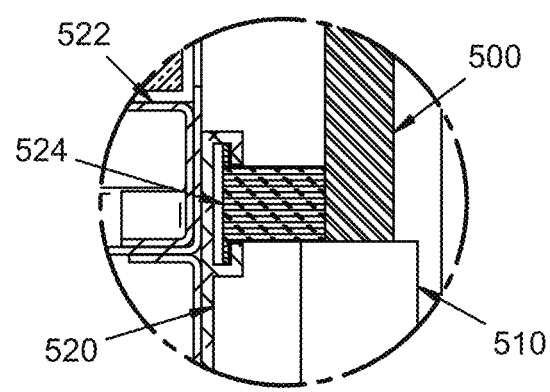
FIG. 7 is an exploded view of circle 7 of FIG. 3.

The mechanical shutter or damper 500 controls the air flow's route through the evaporator coils 14a to 14e. The mechanical shutter or damper 500, when in its closed position, inhibits air at the proximal end 18a to 18e of the evaporator coils 14a to 14e. The development of a chamber sealing method of the mechanical shutter or damper 500 reduces air bypass and leakage to insure the ventilation air is routed only thru the active and exposed evaporator coil(s) 14a to 14e. In the mechanical shutter embodiment, illustrated at FIGS. 2 and 3, the refrigeration system 16 has a shutter track 510 positioned along two opposing sides of the evaporator coils 14a to 14e and in front of the proximal end 18a to 18e of the evaporator coils 14a to 14e, as illustrated at FIGS. 2, 3, and 7. The shutter track 510 guides and orientates the shutter 500 into a proper and desired position. The shutter/damper controller 200 moves the shutter 500 through a shutter motor with feedback signal 502 along and "up and down" the shutter track 510 in order to expose or close the respective air aperture 144a to 144e. A damper position sensor 503 determines the shutter's position and reports that information to the shutter/damper controller 200 as confirmed in FIG. 5.

The bottom portion of each air aperture 144a to 144e is defined by, and the support for each evaporator coil 14a to 14e, is a base 520a to 520e as illustrated by FIGS. 3 and/or 7. Within each base 520a to 520e is an evaporator drain pan 522. This condensate control strategy removes moisture from the ventilation air, which is collected and not allowed to re-evaporate on lower evaporator coil(s) 14a to 14d. This can be effected, for example, by collecting the condensate in evaporator drain pan 522 of evaporator coil 14e. The base 520b defines the top surface of air aperture 144a, the base 520c defines the top surface of air aperture 144b, the base 520d defines the top surface of air aperture 144c, the base 520e defines the top surface of air aperture 520d, and the shutter motor with feedback signal's 502 bottom surface defines the top surface of air aperture 520e. Inverse and other configurations are also possible. The right and left side surfaces of the air apertures 144a to 144e are defined by walls or other separators such that each evaporator coil 14a to 14e is independent and separate.

Protruding from the proximal side (i.e., the upstream or intake side) of each base 520a to 520e is a brush seal 524. The brush seal 524 protrudes from each base 250 in order to contact the shutter 500. When the brush seal 524 contacts the shutter 500, the air aperture(s) 144a to 144e positioned above the contact between the seal 524 and the shutter 500 are closed so no air passes through those air aperture(s). The mechanical shutter 500 therefore allows only for active evaporator coils 14a to 14e to be exposed to the air flow path and adjusts the evaporator coil surface based on the airflow demand. By varying the evaporator coil surface the DOAS avoids lowering evaporator coil face velocities and having laminar flow at the evaporator coil boundaries that drastically affect the evaporator coil performance. In addition, since the evaporator surface is not fixed, the compressor does not have to work to keep the full evaporator surface at the desired supply air dew point in order to maintain the dehumidification process, resulting in reduced energy consumption.

Figure 8:
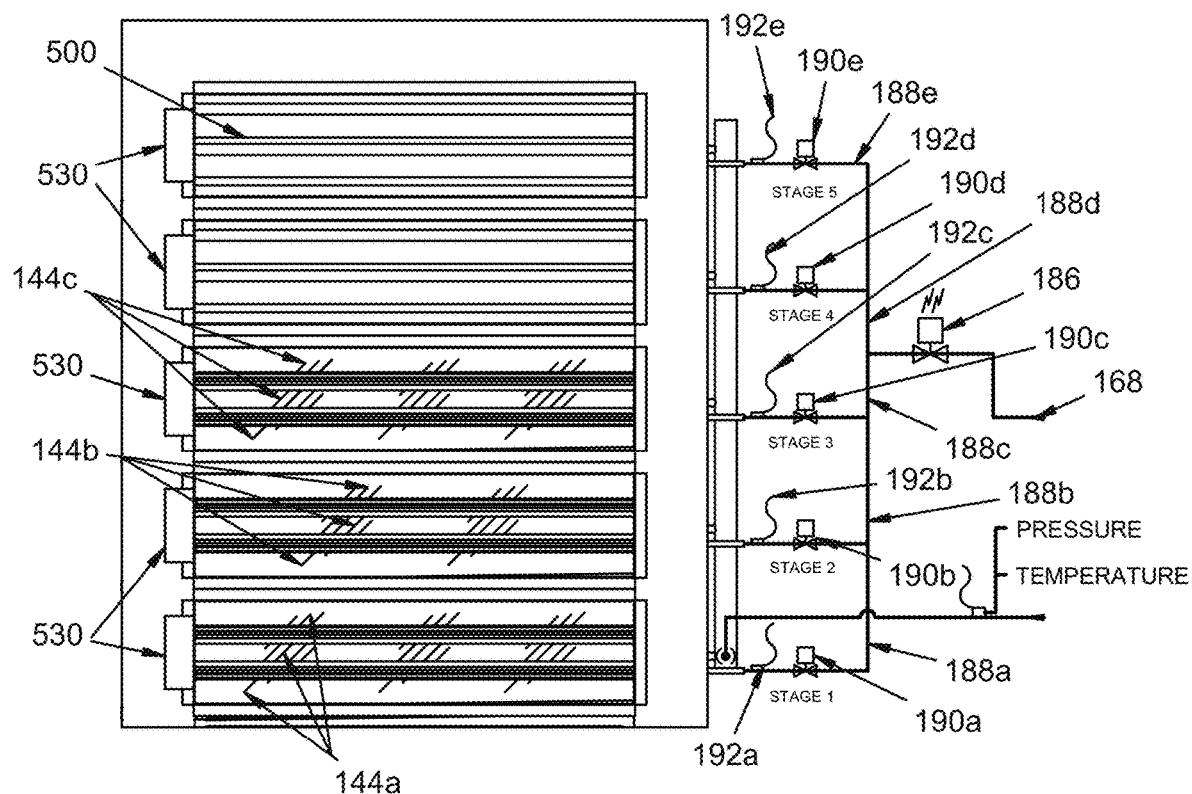
FIG. 8 is an alternative embodiment of FIG. 2.

FIG. 8 illustrates using a mechanical damper, instead of a shutter, to open or close air aperture(s) 144a to 144e. Each air aperture 144a to 144e has a mechanical damper positioned at its proximal end. Each mechanical damper has an actuator 530 interconnected to the shutter/damper controller 200. The shutter/damper controller 200 opens and closes each mechanical damper through its corresponding actuator 530 to accomplish the same objective as the shutter. Likewise the damper position sensor 503 confirms if the dampers are properly closed or not and transmits that information to the shutter/damper controller 200.

Figure 9:
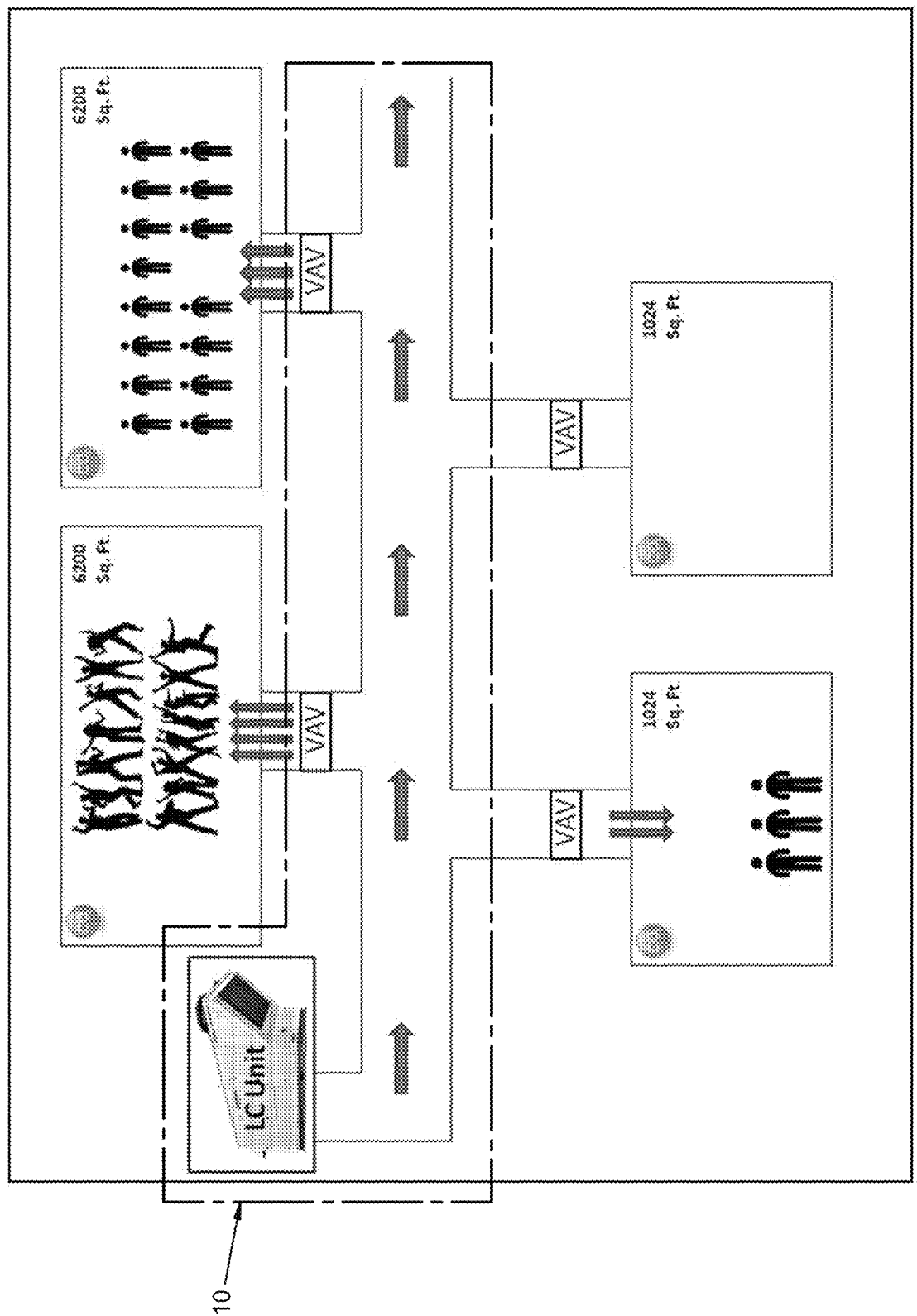
FIG. 9 illustrates the DOAS of FIG. 1 being used in a building.

FIG. 6 in combination with FIG. 1 demonstrates that the supply fan 100 can be electrically connected with the variable speed drive supply fan unit 102 and can be operated by the fan controller 240. The fan controller 240 can be a direct digital controller (DDC) that co-ordinates the mechanical and electrical components in a sequence and at a speed rate to realize the desired leaving air conditions. The fan controller 240 receives a measurement signal 105 from the supply fan air flow monitoring station/piezo ring sensor 104, a measurement signal 107 from the supply air differential pressure transducer 106, a measurement signal(s) 605 from a room/zone damper actuator(s) with auxiliary contacts 604 which controls a corresponding room damper 606 that such as illustrated at FIG. 9, a measurement signal(s) 109 from the supply air temperature sensor 108; a measurement signal(s) 111 from the supply air relative humidity sensor 110 wherein the measurement signal(s) 109 is divided by the measurement signal(s) 111, and signals 113 from the customer feedback regarding the speed of the fan. As a result of those inputs, 107, 605, 105, 109, 111, and 113, the supply fan increases, decreases or maintains the air speed directed to the specific rooms. The supply fan 100 or fans are capable of delivering a variable air flow rate from a desired minimum to maximum of a given design system. These supply fan(s) 100 deliver the desired CFM at the total system static and may be able to be turned down to an adequate desired air delivery while always operating in a stable region.

The HVAC/DOAS systems herein can operate, for example, as a 2 ton, 4 ton, 6 ton, 8 ton, 10 ton, or 30 ton system, or other power as desired, balancing capacity against load at each of a plurality, such as five (5) or more, operating points based for example on the scheduled or demand ventilation rate. Capacity can be supplemented by the addition of one (1) or more additional units, such as 10 ton fixed capacity units, to allow systems up to 30 tons or otherwise as desired, for example in 2 ton increments.

The systems herein provide for multiple control strategies so that users can, if desired and for example, set up a ventilation schedule base on zones and time of day, a schedule based on planned occupancy and time of day, planned occupancy, time of day with a $CO_2$ override, or ventilation strictly based on deviation of $CO_2$ levels when compared to outdoor levels.

As previously expressed, the DOAS 10 can be equipped with, for example, five (5) independent and separated cooling heat exchangers such as evaporator coils, with independent refrigerant metering, in order to provide desired cooling capacity during the day. The DOAS 10 can have active a partial number of evaporator coils, for example during the early morning hours, then as the ambient load increases during the day the DOAS 10 has the ability to increase cooling capacity by activating more evaporator coils in order to accommodate the desired conditions of the conditioned space. This feature allows for the compressor to operate on a variable refrigerant flow rather than simply perform on/off operation. Thus, the unit can work at a desired rate allowing for substantial savings especially at partial-load conditions.

The DOAS 10 is also equipped block-off element such as a mechanical shutter that allows if desired for only active evaporator coils to be exposed to the air flow path, thereby adjusting the evaporator coil surface based on the airflow demand. By varying the evaporator coil surface instead of air flow velocity, the DOAS avoids lowering air flow velocities at evaporator coil faces and thereby having differential laminar flow at the evaporator coil boundaries that drastically affect the evaporator coil performance. In addition, since the evaporator surface is not a fixed amount, the compressor does not have to work as hard to keep the full evaporator surface at the desired supply air dew point in order to maintain the dehumidification process, resulting in reduced energy consumption.

Ventilation can be scheduled to meet demand in different zones based on occupancy and time of the day with an $CO_2$ override as shown in the following examples, or strictly on $CO_2$ levels when they deviate from $CO_2$ outdoor levels. At FIG. 9, four (4) different zones are shown, two typical classrooms at 1024 sq. ft. and two multipurpose rooms with 6200 sq. footage. The ventilation demand is estimated based on the ASHRAE 62.1 standard:

Classroom (age 9 plus): Ventilation Demand =
$$10\frac{cfm}{person} * 3 \text{ people} + 0.12\frac{cfm}{ft^2} * 1024 \text{ ft}^2 = 163 \text{ cfm}$$

Dance room: Ventilation Demand =
$$10\frac{cfm}{person} * 15 \text{ people} + 0.06\frac{cfm}{ft^2} * 6200 \text{ ft}^2 = 522 \text{ cfm}$$

Assembly room: Ventilation Demand =
$$7.5\frac{cfm}{person} * 25 \text{ people} + 0.06\frac{cfm}{ft^2} * 6200 \text{ ft}^2 = 485 \text{ cfm}$$

The arrows illustrated at FIG. 9 show an exemplary air path in order to address ventilation demand at 4 different zones based on occupancy and sq. footage. As an example, when one of the multipurpose rooms is being utilized as a dance floor it will have the highest level of $CO_2$ accumulated, and it will utilize a higher ventilation rate compared to the other 3 zones. A variable air volume (VAV) box (sometimes referred to as a room damper 606) is installed in the duct to assist with the on-demand ventilation. In contrast, the second multipurpose room, although it has the same square footage and same number of occupants, has a lower ventilation rate due to lower physical activity by the occupants. A first of the two classrooms is unoccupied so no ventilation might be desired. The second classroom has only 3 occupants at the time thus relative low ventilation is desired. The DOAS can adjust the refrigerant flow and the air flow the condenser evaporator coils treat in order to meet demand in the four different zones without over/under-performing at any time.

Example

An exemplary sequence of operation:

Each controller 180, 200, 240 is a part of a system controller 700, such as an ALC controller, that permits a user to enter information to alter at least controller 240. The system controller is turned on by a switch. Several occupancy control options are available for stating the unit. These can be selected from the display pad on the system controller. A resident program has an adjustable scheduler that uses an internal time clock to allow for separate sequences for occupied and unoccupied periods. All temperature related events have a fixed delay (normally 10 to 30 seconds) to allow temperatures to settle.

In the occupied mode, the display pad schedule calls for the start of the occupied mode, and the system controller has verified that there are no fault or shutdown conditions. After the fixed delay, the DOAS unit 10 goes into occupied mode. The occupied mode has the supply fan 100 run for a predetermined time period—for example 30 seconds to five minutes, such as about 1 minute—prior to cooling or heating being initiated. The supply fan will be initiated when the shutter 500 is 33% or above open, and/or the direct expansion evaporator coil 14b is open. The supply fan will operate continuously while the DOAS 10 is in the occupied mode. When the DOAS 10 reaches the end of the occupied mode period, the supply fan 100 will continue to fun for an additional time period for example about 1 to 5 minutes, or such as about 2 minutes before turning off.

The supply fan 100 with variable speed control 102 will modulate its speed based on the demand cubic feet per minute (CFM) (as a percentage of a maximum CFM set point). The demand CFM is determined by the demand control ventilation via $CO_2$ sensor(s) 610.

A cooling mode is available when the outdoor air temperature as measured by sensor 52 is a predetermined (for example about 1° F. to 10° F., e.g., about 1° F. to 2° F.) above the outdoor air temperature cooling lower limit (for example about 40° F. to 60° F., e.g., about 50° F., which temperature can be adjustable) and there is a demand for cooling. When the outdoor air dew point as measured by sensor 56 is a predetermined temperature differential (about 1 to 10° F., e.g., 1° F. to 2° F., which can be adjustable) or more above the supply air dew point set point (about 40 to 65° F., e.g., 55° F., which can be adjustable), the variable speed (first) compressor 160 turns on. When the supply air dew point as measured by sensor 106 is a predetermined temperature differential (e.g., about 1° F. to 10° F., e.g., about 2° F., which can be adjustable) and more above the supply air dew point set point (e.g., about 40 to 65° F., about 55° F., which can be adjustable), the second compressor 166 turns on for not less than a predetermined operation time (e.g., about 1 to 60 minutes, about 30 minutes, which can be adjustable) after the first compressor is turned on.

When the supply air dew point as measured by sensor 106 is a predetermined temperature differential (e.g., about 1° F. to 10° F., e.g., 1° F. to 2° F., which can be adjustable) and more below the supply air dew point set point (e.g., about 40° F. to 65° F., e.g., about 55° F., which can be adjustable), the second compressor 166 turns off. When the outdoor air dew point as measured by sensor 56 is a predetermined temperature differential (e.g., about 1° F. to 10° F., e.g., about 1° F. to 2° F., which can be adjustable) or more below the supply air dew point set point (e.g., about 40° F. to 65° F., e.g., about 55° F., which can be adjustable), the variable speed (first) compressor 160 turns off. There is a compressor logic that includes a certain minimum run-time (for example about 1 to 20 minutes, e.g., about 5 minutes, which can be adjustable) and a similar minimum time-off delay to inhibit compressor short cycling.

The system controller controls (e.g., Automated Logic Controller (ALC)) controls the capacity of the variable speed compressor by modulating the speed of the compressor. The variable speed compressor modulates upon the supply air dew point as measured by sensor 106 set point. The modulation can be modified based upon the suction line pressure set point (e.g., about 90 to 120 psi, such as 105 psi, which can be adjustable), as measured by sensor 184, to provide freeze protection. In the suction line temperature, as measured by sensor 172, drops to a specific temperature, for example 35° F. (which can be adjustable) or less for a certain time period, such as 2 to 5 minutes, e.g., 3 minutes, which time period can be adjustable), the system controller will transmit an alarm and the compressor will stop. When the suction line temperature warms to a desired temperature, for example 50° F. or more, the compressor turns back on.

If there is a current call for first stage cooling and the first compressor is shut down due to an alarm, the damper for the second circuit will open and the second compressor will be turned on to take its place until it returns. When the variable speed compressor is locked out, the shutter 500 will close.

The system controller also modulates the electronic expansion valves 186, 190a to 190e positions electronically to adjust the flow of refrigerant to maintain the desired evaporator super heat set point (for example 1° F. to 10° F., e.g., 6° F., which set point can be adjustable) based upon the suction line temperature, as measured by sensor 172, minus the liquid pipe temperature as measured by sensor 174.

The shutter 500 opens based on the CFM demand. If the CFM reading is above the CFM level corresponding to the shutter 500 position, the shutter 500 opens to accommodate the CFM demand. If the CFM reading is below the CFM level corresponding to the shutter position, the shutter closes to accommodate the CFM demand.

The status of outside air damper 710 for the refrigerant circuit to the expansion evaporator coils 14a to 14e will open based on the demand CFM and/or call from the second compressor.

A heating mode is available when the outside air temperature is, for example, 1° F. below the outside air temperature heating upper limit, for example, 60° F. (and it is adjustable), and there is a demand for heating. When the outside air temperature is, for example, 1° F. or more below the outside air temperature heating set point, for example and it is adjustable, 53° F., heating is initiated and operates based upon supply air temperature, as measured by sensor 108, heating set point, for example is and can be adjusted, 70° F. When the outside air temperature is, for example, 1° F. or more above the outside air temperature heating set point, heating is disabled.

Unless otherwise stated, adjectives herein such as "substantially" and "about" that modify a condition or relationship characteristic of a feature or features of an embodiment, indicate that the condition or characteristic is defined to within tolerances that are acceptable for operation of the embodiment for an application for which it is intended.

All terms used herein are used in accordance with their ordinary meanings unless the context or definition clearly indicates otherwise. Also unless expressly indicated otherwise, in the specification the use of "or" includes "and" and vice-versa. Non-limiting terms are not to be construed as limiting unless expressly stated, or the context clearly indicates, otherwise (for example, "including," "having," and "comprising" typically indicate "including without limitation"). Singular forms, including in the claims, such as "a," "an," and "the" include the plural reference unless expressly stated, or the context clearly indicates, otherwise.

The scope of the present devices, systems and methods, etc., includes both means plus function and step plus function concepts. However, the claims are not to be interpreted as indicating a "means plus function" relationship unless the word "means" is specifically recited in a claim, and are to be interpreted as indicating a "means plus function" relationship where the word "means" is specifically recited in a claim. Similarly, the claims are not to be interpreted as indicating a "step plus function" relationship unless the word "step" is specifically recited in a claim, and are to be interpreted as indicating a "step plus function" relationship where the word "step" is specifically recited in a claim.

From the foregoing, it will be appreciated that, although specific embodiments have been discussed herein for purposes of illustration, various modifications may be made without deviating from the spirit and scope of the discussion herein. Accordingly, the systems and methods, etc., include such modifications as well as all permutations and combinations of the subject matter set forth herein and are not limited except as by the appended claims or other claim having adequate support in the discussion and figures herein.

What is claimed is:

1. A dedicated outdoor air system (DOAS) comprising a plurality of evaporator coils each with independent refrigerant control configured to independently vary refrigerant flow for each of the evaporator coils to maintain a desired evaporator coil temperature; independent activation of evaporator coil surface for each of the plurality of evaporator coils; and, at least one block-off element disposed for independent adjustment of airflow for each of the plurality of evaporator coils, wherein the system is configured to obtain free cooling by positioning the block-off element to direct ventilation air to bypass active evaporator coil surface.

2. The dedicated outdoor air system (DOAS) of claim 1 wherein block-off element position is controlled by a demand volume of supply air, a cooling load of the demand air volume or an outdoor humidity level.

3. The dedicated outdoor air system (DOAS) of claim 1 wherein the system maintains an about 45° F. evaporator coil temperature.

4. The dedicated outdoor air system (DOAS) of claim 1 wherein the block-off element is a linearly positioned sliding block-off element disposed for independent adjustment of airflow and independent activation of evaporator coil surface.

5. The dedicated outdoor air system (DOAS) of claim 1 wherein the system comprises about 3 to 10 stacked evaporator coils.

6. The dedicated outdoor air system (DOAS) of claim 5 wherein the system comprises 5 stacked evaporator coils.

7. The dedicated outdoor air system (DOAS) of claim 6 wherein the system comprises at least one variable refrigerant flow compressor.

8. The dedicated outdoor air system (DOAS) of claim 1 wherein the system is configured such that a first portion of supply air is partly passed over an energized cold deck of an activated evaporator coil and a second portion of supply air by-passes the activated evaporator coil while maintaining a desired supply air dew point.

9. The dedicated outdoor air system (DOAS) of claim 1 wherein the system comprises a fixed capacity vapor compression system.

10. The dedicated outdoor air system (DOAS) of claim 1 wherein the system is structurally capable of providing constant dew point leaving air.

11. The dedicated outdoor air system (DOAS) of claim 10 wherein the system comprises a plurality of evaporators and the constant dew point leaving air is obtained by selectively controlling variable air flow and variable refrigerant flow based on the heat load presented to each active evaporator.

12. The dedicated outdoor air system (DOAS) of claim 1 wherein the system is located within a single housing and the block-off element is a shutter or damper disposed to move up and down a front side of the housing, wherein the front side of the housing receives air flow.

13. The dedicated outdoor air system (DOAS) of claim 12 wherein the shutter or damper is a motor driven shutter or damper with a linear positioner.

14. The dedicated outdoor air system (DOAS) of claim 1 wherein each evaporator coil is disposed within an independent compartment and each independent compartment comprises an intermediate drain pan.

15. The dedicated outdoor air system (DOAS) of claim 1 wherein heat transfer in each active evaporator coil is maintained with an electronic expansion valve operably connected to a system controller.

16. A method comprising manufacturing a system according to claim 1.

17. The dedicated outdoor air system (DOAS) of claim 1, wherein the system is located within a single housing and further comprises a directional air flow exposure valve comprising a plurality of dampers each configured to independently open and close as directed by a system controller.

18. The dedicated outdoor air system (DOAS) of claim 17, wherein the system is located within a single housing, each evaporator coil is disposed within an independent compartment, and each of the plurality of dampers is configured to independently open and close as directed by the system controller to independently address a corresponding evaporator coil.

19. The dedicated outdoor air system (DOAS) of claim 18, wherein each independent compartment comprises an intermediate drain pan.

20. The dedicated outdoor air system (DOAS) of claim 1, wherein a system controller positions a directional air flow exposure valve to shunt bypass air to obtain a desired mixed leaving air temperature and relative humidity.

21. A method comprising using a system according to claim 1.

* * * * *